(12) United States Patent
Bonanno et al.

(10) Patent No.: US 8,468,124 B2
(45) Date of Patent: Jun. 18, 2013

(54) DEBUGGING WORKFLOWS

(75) Inventors: James M. Bonanno, Raleigh, NC (US); Steven D. Ims, Apex, NC (US); Todd E. Kaplinger, Raleigh, NC (US); Aaron J. Tarter, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/827,995

(22) Filed: Jun. 30, 2010

(65) Prior Publication Data

US 2012/0005659 A1     Jan. 5, 2012

(51) Int. Cl.
*G06F 17/30*     (2006.01)

(52) U.S. Cl.
USPC .......................................................... 707/608

(58) Field of Classification Search
None
See application file for complete search history.

(56) References Cited

U.S. PATENT DOCUMENTS

| | | | |
|---|---|---|---|
| 7,464,373 B1 | 12/2008 | Yunt et al. | |
| 7,607,124 B2 | 10/2009 | Gooty et al. | |
| 7,640,538 B2 * | 12/2009 | Bennett et al. | 717/129 |
| 2003/0217355 A1 | 11/2003 | Hack et al. | |
| 2004/0031019 A1 | 2/2004 | Lamanna et al. | |
| 2006/0190929 A1 | 8/2006 | Bennett et al. | |
| 2006/0225042 A1 * | 10/2006 | Bennett et al. | 717/124 |
| 2006/0288332 A1 * | 12/2006 | Sagar et al. | 717/124 |
| 2007/0266368 A1 * | 11/2007 | Szpak et al. | 717/105 |

OTHER PUBLICATIONS

Burns, Jesse, "Attacking Applications by Fuzzing Win32 IPC", http://www.docstoc.com/docs/23984348/Attacking-Applications-by-fuzzing-win32-IPC-channels Jul. 2006, 38 pages.

* cited by examiner

*Primary Examiner* — Bai D. Vu
(74) *Attorney, Agent, or Firm* — DeLizio Gilliam, PLLC

(57) ABSTRACT

Some embodiments of the inventive subject matter are directed to a debugging system ("system") configured to access a work flow document. The workflow document may include references to flow activities connected by flow connectors, forming a workflow path. Some of the flow connectors may have breakpoints. The debugging system can insert command instructions for a hypertext transfer protocol (HTTP) request into the workflow document at locations associated with the flow connectors and initiate a test run of the workflow path. In some embodiments, during the test run, when one of the flow connectors is reached, the system executes the command instructions for the HTTP request, sending the HTTP request to a debugger application ("debugger"). If a breakpoint is associated with the flow connector, the debugger can delay response to the HTTP request, otherwise the debugger can respond immediately. A user can debug the workflow document during the delay.

20 Claims, 5 Drawing Sheets

DEBUGGING WORKFLOWS

BACKGROUND

Embodiments of the inventive subject matter generally relate to the field of workflows, and, more particularly, to debugging workflows.

A workflow management system is a computer system that manages and defines a series of tasks within an organization to produce a final outcome or outcomes. Workflow management systems can allow a user to define different workflows for different types of jobs or processes. For example, in a manufacturing setting, a design document might be automatically routed from designer to a technical director to the production engineer. At each stage in the workflow, one individual or group is responsible for a specific task. Once the task is complete, the workflow management system (e.g., a workflow management application) can ensure that the individuals responsible for the next task are notified and receive the data they need to execute their stage of the process. Workflow management systems also automate redundant tasks and ensure uncompleted tasks are followed up. Workflow management systems may control automated processes in addition to replacing paper work order transfers. If, for example, the design document mentioned above is made available in one format but the workflow requires the design document to be in another format, for a subsequent part of the automated process, the workflow management system would implement a conversion prior to notifying the individual responsible for the next task. A workflow management system can thus track dependencies required for the completion of each task at each stages of the workflow process. Workflow management systems can also execute automated services for parts of, or all, of the workflow. In many instances, workflows can be initiated by automated processes and complete entire workflow paths without user intervention.

SUMMARY

Embodiments include a method directed to detecting placement of flow connectors in a graphical flow diagram of a work flow document run in a workflow management application, where the graphical flow diagram includes flow activity graphics connected by the flow connectors forming a workflow path. In some embodiments, the method is further directed to inserting hypertext transfer protocol request commands into the workflow document at locations associated with the flow connectors, initiating a test run of the workflow path, encountering one of the flow connectors during the test run of the workflow path, and executing one of the hypertext transfer protocol request commands associated with the one of the flow connectors. In some embodiments, the method is further directed to sending a hypertext transfer protocol request to a debugger application, and waiting for a response message to the hypertext transfer protocol request from the debugger application.

Embodiments include an apparatus comprising a processing unit, a network interface, and a debugger module. In some embodiments, the debugger module is operable to receive a hypertext transfer protocol request from a test run of a workflow document, wherein the workflow document includes a hypertext transfer protocol command associated with a workflow connector object, where the workflow connector object connects workflow activity objects, and where during the test run of the workflow document, the workflow connector object is accessed, which causes the execution of the hypertext transfer protocol command, which initiates the hypertext transfer protocol request. In some embodiments, the debugger module is further configured to detect a breakpoint object associated with the workflow connector object during the test run of the workflow document, and delay a response message for the hypertext transfer protocol request, wherein the delay of the response message causes the test run of the workflow document to suspend a run state.

Embodiments include a computer program product for debugging a workflow. The computer program product comprises a computer readable medium having computer readable program code. In embodiments, the computer readable program code is configured to detect placement of flow connectors in a graphical flow diagram of a work flow document run in a workflow management application, where the graphical flow diagram includes flow activity graphics connected by the flow connectors forming a workflow path. In some embodiments, the compute readable program code is further configured to insert hypertext transfer protocol request commands into the workflow document at locations associated with the flow connectors and initiate a debugging mode that begins a test run of the workflow path. In some embodiments, the compute readable program code is further configured to encounter one of the flow connectors during the test run of the workflow path and execute one of the hypertext transfer protocol request commands associated with the one of the flow connectors. In some embodiments, the compute readable program code is further configured to send a hypertext transfer protocol request to a debugger application, and wait for a response message to the hypertext transfer protocol request from the debugger application.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
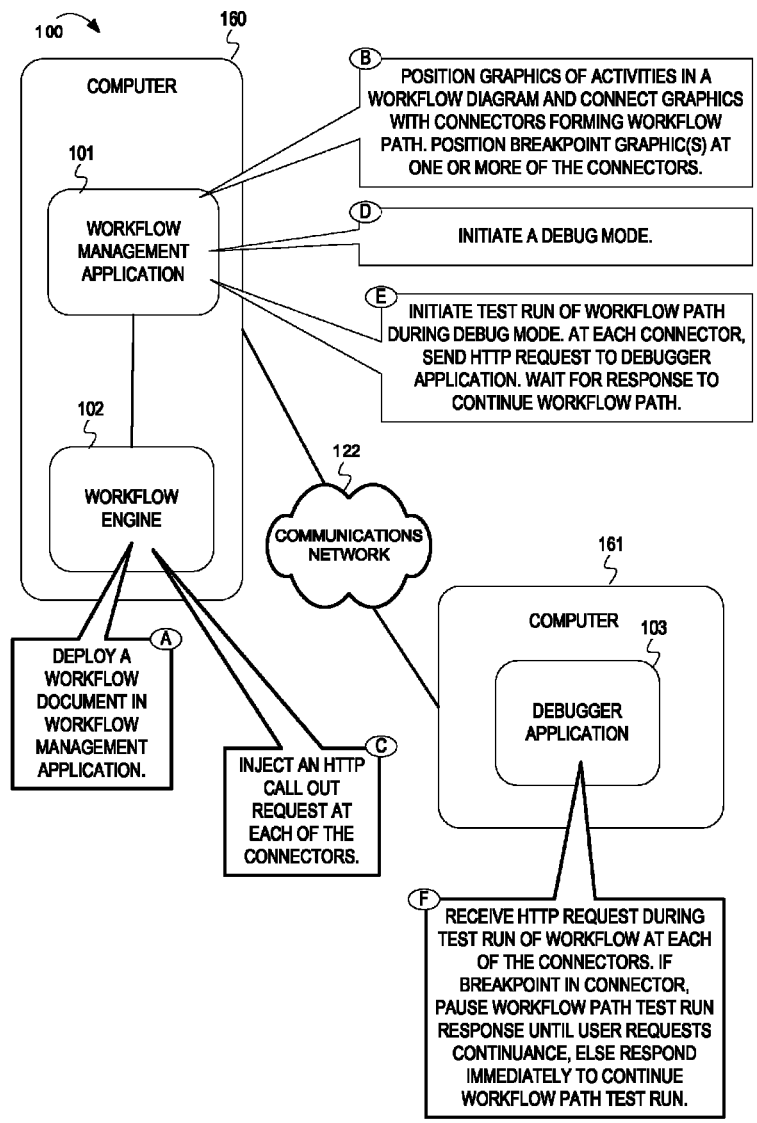
FIG. 1 is an example conceptual diagram of debugging a workflow via HTTP requests between a debugger application and a workflow management application.

The description that follows includes exemplary systems, methods, techniques, instruction sequences, and computer program products that embody techniques of the present inventive subject matter. However, it is understood that the described embodiments may be practiced without these specific details. For instance, although examples refer to hypertext transfer protocols in other instances examples may include other application layer protocols such as the Border Gateway Protocol (BGP), Dynamic Host Configuration Protocol (DHCP), File Transfer Protocol (FTP), GPRS Tunneling Protocol (GTP), Internet Message Access Protocol (IMAP), Internet Relay Chat (IRC), Lightweight Directory Access Protocol (LDAP), Simple Mail Transfer Protocol (SMTP), Secure Shell (SSH), Transport Layer Security/Secure Socket Layer (TLS/SSL), Extensible Messaging and Presence Protocol (XMPP), etc. In other instances, well-known instruction instances, protocols, structures, and techniques have not been shown in detail in order not to obfuscate the description.

A workflow is usually stored in a workflow document. The workflow document can store information that defines or describes the workflow. The workflow document can be loaded, or deployed, in a workflow application, which depicts the workflow associated with the workflow document using formal or informal flow diagramming techniques, showing directed flows between processing stages. A processing stage may include steps, activities, components, etc. for the workflow to perform. The processing stage can include parameters, such as inputs descriptions, transformation rules, and output descriptions. Input descriptions include information, material, energy, etc. required to complete an activity, or step, in a workflow. Transformation rules may include processes, or algorithms, which may be carried out by associated human roles or machines, or a combination. Output descriptions may include information, material, energy, etc. produced by the activity, or step. The output descriptions can further be provided as input to downstream steps. The steps, activities, components, etc. of the processing stage, usually can only be plugged together within a workflow if the output of one stage is equal to mandatory input requirements of a stage that immediately follows. Rules can be used to control alternative ways to transform one type of input into another type of output.

Thus, workflows can be very useful tools that automate processes in businesses. When a workflow fails to work, however, a business can lose productivity. A user in charge of creating and/or maintaining workflows would want to know at which point in the workflow the failure occurs. If the final result of the workflow is not the expected one, the user will want to know how the flow result was corrupted (e.g. a point at which a transformation produced an unexpected result).

Some embodiments of the present invention provide a method for performing debugging on workflows using a debugging system that utilizes an application layer communication protocol. Some embodiments include communicating debugging requests to a debugger application using the Hypertext Transfer Protocol (HTTP). HTTP is an application layer protocol used, for example, in distributed, collaborative, hypermedia information systems. HTTP is a request-response protocol standard for client-server computing. In some embodiments, a client application (e.g., a workflow management software application) communicates debugging commands with a server application (e.g., a debugger application) via HTTP. The client submits an HTTP request to the responding server by sending messages to it. The server, which stores content (or resources), or provides services, can generate content on the fly and/or send messages back to the client in response. These returned messages may contain the content requested by the client or may contain other kinds of response indications.

FIG. 1 is an example conceptual diagram of debugging a workflow via HTTP requests between a debugger application and a workflow management application. In FIG. 1, a workflow debugging system ("system") 100 includes a first computer 160 that runs a workflow management application 101 and a workflow engine 102. The first computer 160 can run the workflow management application 101 using one or more processors on the first computer 160. In some embodiments, the workflow management application 101 may be a web application that runs in a web browser on the first computer 160. The first computer 160 may be referred to as a client. In some embodiments, the workflow engine 102 may be in a separate computer accessible via a communications network 122.

The system 100 also includes a second computer 161 that runs a debugger application 103. The first computer 160 and the second computer 161 are connected via the communications network 122. The workflow management application 101 can be a client application that accesses the debugger application 103, which acts as a server. In some embodiments, multiple workflow management applications can access the server from one or more locations or devices (e.g., multiple instances of the workflow management application 101 on the computer 160 access the debugger application 103, separate instances of the workflow management application 101 on other computers access the debugger application 103, etc.). In some embodiments, because the debugger application 103 runs as a server, many instances of the workflow management application 101 can access the debugger application 103 without requiring a debugging module on the client. Further, in some embodiments, because the debugger application 103 and the workflow management application 101 can communicate via HTTP requests, the workflow management application 101 and the debugger application 103 can communicate via the Internet and can perform debugging over networks without the need for custom protocols.

In some embodiments, the system 100 may combine the workflow management application 101, the workflow engine 102, and the debugger application 103 into a single module or include each element on the same computer or device.

A user, or other entity (e.g., a computer, a process, a service, etc.), may access the workflow management application 101 and manipulate (e.g., create, modify, run, etc.) a workflow document that describes a workflow. The workflow document, for instance, may be an Extensible Markup Language (XML) document that was generated via a design session using a design tool of the workflow management application 101.

Figure 2:
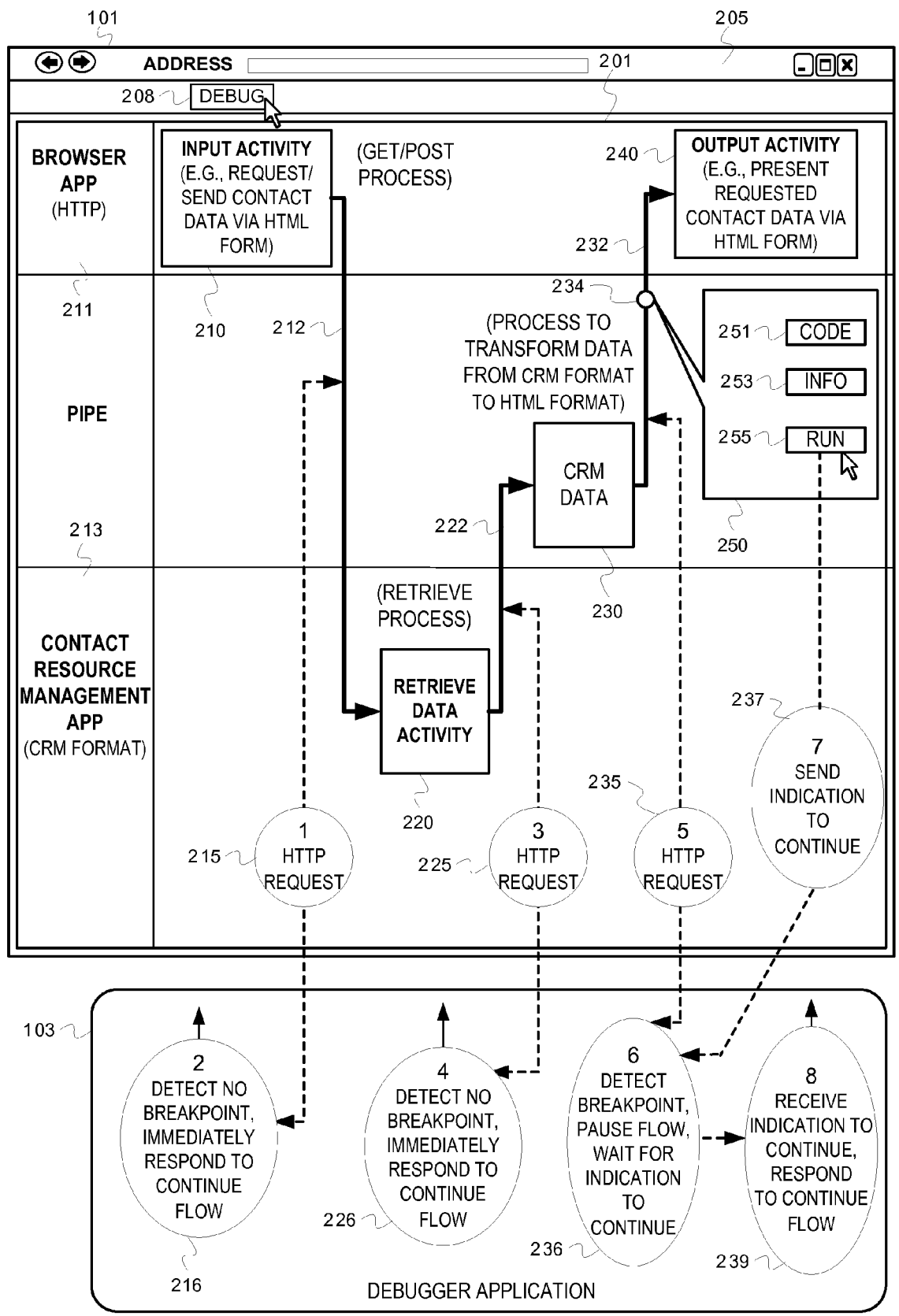
FIG. 2 is an example conceptual diagram depicting running a workflow in debugging mode.

The user, or other entity, may initiate a command to open or create the workflow document via the workflow management application 101. The system 100 can perform a process that has various parts or stages. At stage "A," the workflow engine 102 can deploy the workflow document in the workflow management application 101. The workflow management application 101 reads code (e.g., the XML code) contained within the workflow document and presents a graphical representation of the workflow. The workflow management application 101 may visually present the workflow in a graphical user interface. For example, FIG. 2 is an example conceptual diagram depicting running a workflow in debugging mode. FIG. 2 illustrates an exemplary workflow diagram 201 presented in a graphical user interface (GUI) 205 of an instance of the workflow management application 101 running as a client application (e.g., as a web browser client). FIG. 2 will be referred to in concert with the description of FIG. 1.

Returning to FIG. 1, at stage "B," the workflow management application 101 positions graphics of activities ("workflow activity graphics") in the workflow diagram and connects the workflow activity graphics with connectors (e.g., connector graphics that represent connector objects in the workflow document), forming a workflow path. The workflow management application 101 can position the workflow activity graphics and connectors via user input. For instance, in FIG. 2, a user can, via the graphical user interface 205, position a first workflow activity graphic 210 in the workflow diagram 201. The workflow activity graphic 210 can represent workflow activity objects (e.g., values, variables, functions, data structures, etc.) and/or commands in the workflow document. The first workflow activity graphic 210 includes an indicator to capture input. For example, the first workflow activity graphic 210 indicates a first activity that another user may perform to initiate the workflow or that the user designing the workflow diagram may perform as part of workflow testing. The first activity, for example, may be a submission of a web form from a web browser application (represented in the workflow diagram 210 as a first application indicator 211). The web form may, for example, request to work with (e.g., retrieve, store, modify or transfer) data in or from a contact resource management application (CRM) and/or an accompanying database (the CRM is represented in the workflow diagram 210 as a second application indicator 211). A second workflow activity graphic 220 may represent an activity that works with the data at the CRM (e.g., searches a name of a contact submitted in the web form and retrieves an address for the contact from the CRM database). A third workflow activity graphic 230 indicates a process that converts, or transforms, data retrieved from the CRM into a format readable by the web browser application (e.g., transforms the CRM data from a CRM format to a web format, such as hypertext markup language, or HTML). A fourth workflow activity graphic 240 presents the requested data in the web form. Each of the workflow activity graphics (210, 220, 230 and 240) may be connected to each other by connectors (e.g., connectors 212, 222, and 232). A user may place the connectors 212, 222, and 232 between the workflow activity graphics 210, 220, 230, and 240 to connect them. The connectors 212, 222, and 232 and the workflow activity graphics 210, 220, 230, and 240 form a workflow path that runs continuously from the first workflow activity graphic 210 to the fourth workflow activity graphic 240.

Returning to FIG. 1, also at stage "B," the system 100 positions and/or detects placement of breakpoint graphics at, or on, the one or more connectors. For example, in FIG. 2, the workflow diagram 201 includes a breakpoint graphic 234 positioned on the connector 232. The breakpoint graphic 234 may represent a breakpoint object referenced in the workflow document. The breakpoint graphic 234 represents a point in the workflow path that the user desires for a test run of the workflow path to pause, or temporarily suspend state, so that the user can analyze data and/or work with code in the workflow document to troubleshoot, fix, optimize, etc. the workflow document.

Returning to FIG. 1, at stage "C," the system 100 associates an HTTP request for each of the connectors. For instance, in FIG. 2, the system 100 can write, (e.g., automatically insert) instructions into parts of a workflow document that are associated with the function of the connectors 212, 222, and 232. Thus, the connectors 212, 222, and 232 are objects that can have properties or functionality associated with them. The inserted instructions will cause an HTTP request to occur when the workflow diagram is run in a debug mode. Each one of the HTTP requests can contain any data relative to the state of the workflow instance in the body of the HTTP request, or in URL query parameters, along with the ID of the next activity to be executed. This will allow the user to examine the current state of the flow and the current position of execution.

Returning to FIG. 1, at stage "D" the system 100 initiates a debug mode, such as via a command from user input, another workflow, etc. At stage "E," the system 100 initiates a test run of a workflow path during the debug mode. At each connector, the system 100 sends an HTTP request to the debugger application 103 when each of the connectors is encountered, in turn, during the test run of the workflow. The system 100, or more specifically, the workflow management application 101, then waits for a response (e.g., a response message) from the debugger application 103 before the workflow continues. At stage "F," the debugger application 103 receives the HTTP request. If the connector does not have a breakpoint associated with it, the debugger application 103 will respond to the HTTP request immediately (i.e., without significant delay) so that the workflow can continue onward until reaching a breakpoint. Once a breakpoint is encountered on one of the connectors, the debugger application 103 will delay a response to the workflow management application 101 until receiving an additional command (e.g., via user input) to indicates that the test run of the workflow should continue a run state, or in other words, to continue past the breakpoint in the connector and to move forward to a subsequent part of the workflow path (e.g., to another activity, to another connector, to another breakpoint, etc.). For example, in FIG. 2, the workflow management application 101 causes HTTP requests 215, 225, and 235 to occur, in an order that follows the workflow path, when the workflow is initiated during debug mode. For example, a user may press a button 208 that initiates the debug mode. The workflow management application 101 begins a test run of the workflow by performing a process associated with the first workflow activity graphic 210. Once the workflow management application performs the process associated with the first workflow activity graphic 210, the workflow management application 101 moves onward, in the test run, to the connector 212. The workflow management application 101 sends a first HTTP request 215 to the debugger application 103. The debugger application 103 very quickly checks that there is no breakpoint for the connector 212 and immediately sends a first response 216 to the workflow management application 101 for the workflow test run to continue without discernible delay so that the test run appears continuous. The workflow management application 101 continues the test run, moving onward to the performance of the process associated with the second workflow activity graphic 220. The workflow management application 101 continues the flow again until reaching the next connector 222, and then sends a second HTTP request 225 to the debugger application 103. The debugger application 103 detects no breakpoint in the connector 222 and immediately sends a second response 226 to the workflow management application 101 for the test run of the workflow to continue without discernible delay. The test run of the workflow continues by performing the process associated with the third workflow activity graphic 230 until reaching the connector 232. The workflow management application 101 sends a third HTTP request 235. The debugger application 103 detects that a breakpoint (e.g., the breakpoint graphic 234) is on, or associated with, the connector 232, and so performs a delay action 236 instead of immediately responding to the workflow management application 101, which causes the test run to suspend, or momentarily delay, a run state. The debugger application 103 waits until receiving an additional indication before sending a response message 239 for the third HTTP request 235. The workflow management application 101 may present a debugging console 250 with a code modification control 251 that a user can select to view or work on code associated with the workflow document, to change properties, etc. The debugging console 250 may also include an information control 253 that a user can select to view information related to the workflow (e.g., information about outputs of previous processes performed during previous activities, information about the current process or upcoming processes, information about data from the CRM application, status data, etc.). The debugging console 250 can also include a continuation control 255 that causes the test run to continue running Upon selection of the continuation control 255, the workflow management application 101 can send a continuation command 237 to the debugger application 103. The debugger application 103 can receive the continuation command 237 and then send the response message 239 for the third HTTP request 235 to the workflow management application 101 so that the workflow management application 101 can continue the test run of the workflow and move onward to the fourth workflow activity graphic 240.

Figure 3:
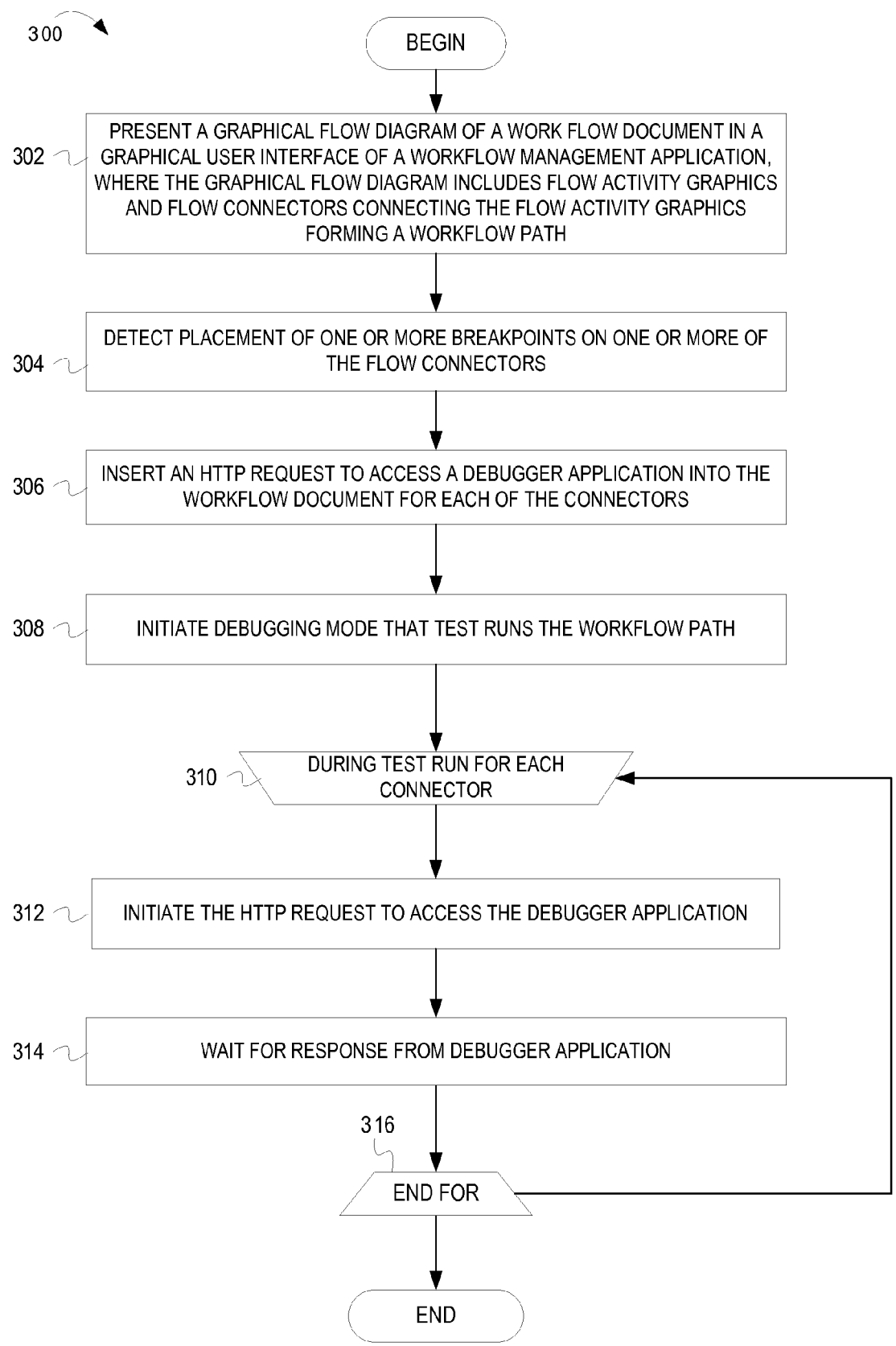
FIGS. 3-4 are flowcharts depicting example operations for debugging a workflow.
Figure 4:
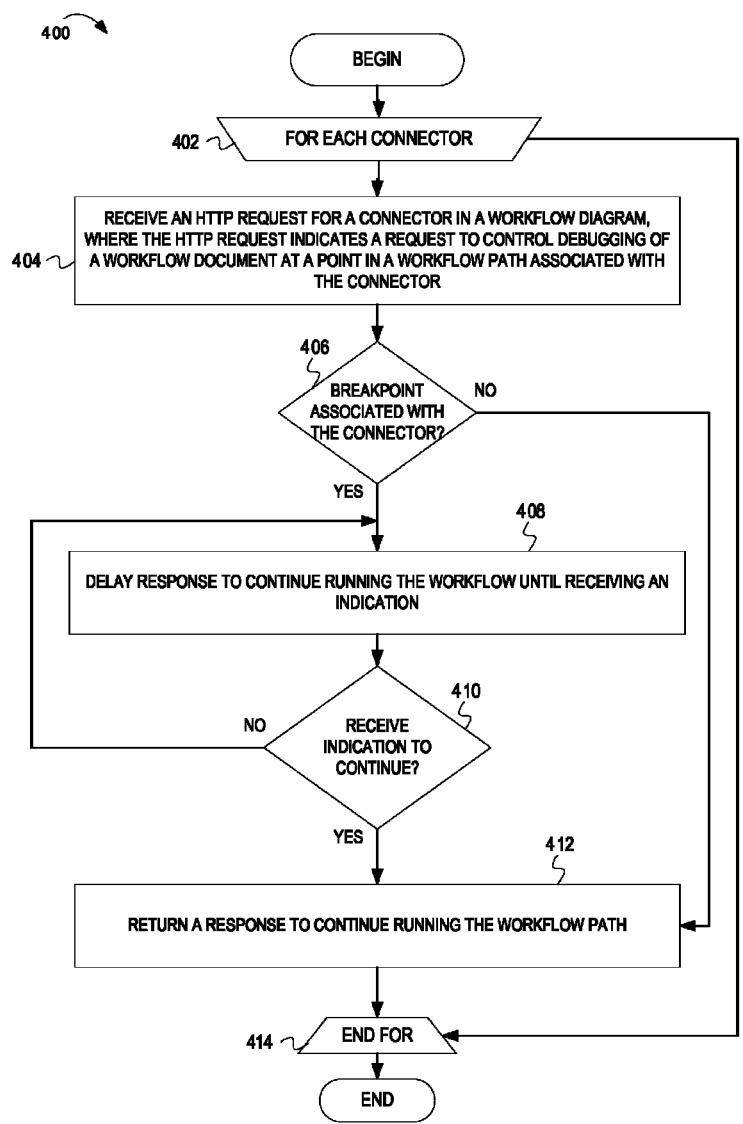

FIGS. 3-4 are flowcharts depicting example operations for debugging a workflow. For exemplary purposes, operations associated with the blocks in FIGS. 3-4 will be described as being performed by a workflow debugging system ("system"), such by any or all of the elements described in FIG. 1 and/or FIG. 2. FIG. 1 or 2 may be referred to during the description of FIGS. 3-4.

FIG. 3 illustrates a flow 300 that the system can perform. The flow 300 may, in some embodiments, include operations that are performed by the workflow management application 101 and/or the workflow engine 102 of FIG. 1 and/or FIG. 2. At block 302, the system presents a graphical flow diagram of a workflow document in a graphical user interface of a workflow management application, where the graphical flow diagram includes workflow activity graphics and flow connectors connecting the workflow activity graphics forming a workflow path. In some embodiments, the system can detect placement in response to user input that places the workflow activity graphics on the workflow diagram (e.g., while generating new workflow documents or for modifying existing workflow document). In other embodiments, the system can detect positions of workflow activity graphics when workflow document is loaded into a GUI for testing purposes.

At block 304, the system detects placement of one or more breakpoints on one or more of the flow connectors.

At block 306, the system inserts an HTTP request to access a debugger application into the workflow document for each of the connectors. In some embodiments, the debugger application can insert the HTTP request into the workflow document or associated the HTTP request with the workflow document so that when a connector is encountered in the workflow during a test run, a workflow engine makes a call out to the debugger via HTTP to initiate a debugging activity.

At block 308, the system initiates a debugging mode that test runs the workflow path. Examples of blocks 304, 306, and 308 were described previously above in FIGS. 1 and 2.

At block 310, the system begins a loop during the test run of the workflow path that repeats whenever the system encounters a connector in the workflow path.

At block 312, the system initiates the HTTP request to access the debugger application. In some embodiments, the system sends activity data to the debugger application in the HTTP request or in response to HTTP requests. The activity data may include a process ID for a process associated with a recent activity, an activity type for a recent activity (e.g., a most recent activity) that was executed, a name for a recent activity, a body of a recent activity, a content type of a recent activity, an address and port of a workflow or activity, an activity ID for the next activity, values declared in a workflow, etc. In some embodiments, the system includes activity data in the body of the HTTP request or in request parameters of a universal resource locator included in the HTTP request for the debugger application.

At block 314, the system waits for a response from the debugger application.

At block 316, the system terminates the loop that began at block 310 by determining whether the workflow path has reached a final activity so that no more connectors are encountered, whether the system detects a user input that terminates the debugging mode, whether the system times out, etc. If the conditions for terminating the loop are met, the flow 300 ends. If the conditions for terminating the loop are not met, the flow 300 returns to block 310 until the conditions are met.

FIG. 4 depicts a flow 400 that a workflow debugging system ("system") can perform. The flow 400 may, in some embodiments, include operations that are performed by the debugger application 103 of FIG. 1. In some embodiments, the flow 400 occurs in parallel with (e.g., concurrently with, in cooperation with, etc.) blocks 310 to 316 of flow 300. At block 402, the system begins a loop for responding to HTTP requests made during a test run of a workflow in a workflow management application. For each instance of a connector in the workflow, the system has previously inserted HTTP request code that makes a request to evaluate whether the workflow should pause the test run for debugging or whether the test run should continue running without interruption.

At block 404, the system receives an HTTP request from a connector in a workflow diagram, where the HTTP request indicates a request to control debugging of a workflow document at a point in a workflow path associated with the connector.

At block 406, the system determines whether a breakpoint is associated with the connector.

At block 406, if the system determines that a breakpoint is associated with the connector, the flow continues at block 408. If at block 406, the system determines that a breakpoint is not associated with the connector, the flow continues at block 412.

At a block 408, the system delays response until receiving an indication to continue the workflow. The indication to continue can be a continuation command that comes from a workflow management application. The continuation command may be an automated command that may result when a debugging objective is met. For instance, at some point in a debugging breakpoint, a user may modify elements of the workflow document (e.g., modify code) that performs a required task. Upon recognizing that the task performs properly, the system may automatically indicate that the workflow should continue running, causing the test run of the workflow to move on to the next workflow activity and/or to a new connector or breakpoint. In some embodiments, the continuation command can come via user input (e.g., a user presses a button in the workflow management application's user interface that indicates that the debugging should continue and that the workflow process should continue processing commands for subsequent activities).

At block 410, the system determines whether an indication to continue the workflow has been received. Determining whether an indication to continue the workflow has been received can mean to receive the continuation command described at block 408. In other embodiments, determining whether the indication to continue the workflow has been received can mean detecting a timeout period and interpreting the occurrence of the timeout period as an indication to continue the test run. Other embodiments, however, can interpret the occurrence of the timeout period to complete the flow 400.

At block 410, if the system determines that the indication to continue the workflow has been received, the flow continues at block 412. If, however, at block 410 the system determines that the indication to continue the workflow has not been received, the flow 400 returns to block 408 and continues to delay running the workflow. In some embodiments, delaying the response may include doing nothing, only waiting until an indication (e.g., a continuation command) is received. If an indication to continue is never received, the system may time out based on a default timeout period, or via a timeout period specified in the HTTP request. In some embodiments, when a timeout period is detected, the system can cause the test run of the workflow to continue. In some embodiments, a workflow engine can allows the debugging application to modify the flow or configure the workflow engine to allow indefinite or maximum timeouts for the HTTP requests. Thus, the system can suspend workflow execution as needed to give the user enough time to inspect the state of the workflow when breakpoints are reached.

At block 412, the system returns a response to continue running the workflow path. For example, the system can return a response message to a workflow management application (i.e., indicate in a response message that the workflow management application is to proceed to the next workflow activity graphic, and perform the process associated with the workflow activity graphic).

At block 414, the system terminates the loop that began at block 402 by determining whether the workflow path has reached a final activity so that no more connectors are encountered, whether the system detects a user input that terminates the debugging mode, whether the system times out, etc. If the conditions are met for terminating the loop, the flow 400 ends. If the conditions are not met for terminating the loop, the flow 400 does not end but returns to block 402 until the conditions are met.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
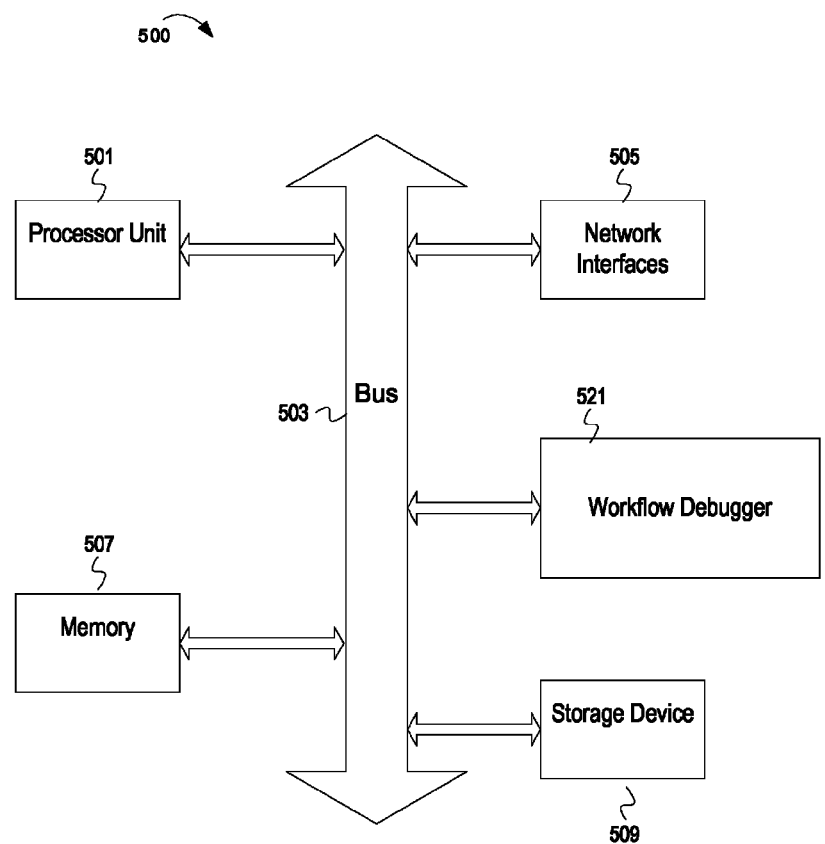
FIG. 5 depicts an example computer system.

FIG. 5 depicts an example computer system 500. The computer system 500 includes a processor unit 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 503 (e.g., PCI bus, ISA, PCI-Express bus, HyperTransport® bus, InfiniBand® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a workflow debugger 521. The workflow debugger 521 can control debugging of a workflow document, including, in some embodiments, inserting hypertext transfer protocol commands into the workflow document in association with workflow connectors and controlling hypertext transfer protocol requests when the workflow connectors are encountered, or accessed, during a test run of the workflow. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for debugging workflows as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting placement of flow connectors in a graphical flow diagram of a work flow document run in a workflow management application, wherein the graphical flow diagram includes flow activity graphics connected by the flow connectors forming a workflow path;
    inserting hypertext transfer protocol request commands into the workflow document at locations associated with the flow connectors;
    initiating a test run of the workflow path;
    encountering one of the flow connectors during the test run of the workflow path;
    executing one of the hypertext transfer protocol request commands associated with the one of the flow connectors;
    sending a hypertext transfer protocol request to a debugger application;
    waiting for a response message to the hypertext transfer protocol request from the debugger application;
    receiving the response message; and
    continuing the test run of the workflow path in response to receiving the response message.

2. The method of claim 1, wherein the workflow management application is a client and the debugger application is a server.

3. The method of claim 1 further comprising:
    detecting a breakpoint in the one of the flow connectors;
    sending an indication of the breakpoint to the debugger application, wherein the debugger application receives the indication of the breakpoint and delays the response message to the hypertext transfer protocol request until receiving a continuation command;
    detecting the continuation command; and
    sending the continuation command to the debugger application, wherein the debugger application receives the continuation command and sends the response message to the workflow management application to continue the test run of the workflow path.

4. The method of claim 3, wherein detecting the continuation command includes detecting a user input via a graphical user interface associated with the workflow management application, wherein the user input indicates that the workflow path should continue the test run.

5. The method of claim 1, wherein initiating the test run of the workflow path includes detecting a user input that specifies a debugging mode.

6. The method of claim 1 further comprising:
    detecting activity data for a process performed immediately before encountering the one of the flow connectors during the test run of the workflow path;
    detecting a user request to view the activity data, during the waiting for the response message to the hypertext transfer protocol request from the debugger application; and
    providing a message indicating the activity data.

7. The method of claim 1, wherein the workflow management application is a web-based application.

8. An apparatus comprising:
    a processing unit;
    a network interface; and
    a workflow debugger operable via the processing unit to:
        receive a hypertext transfer protocol request from a test run of a workflow document, wherein the workflow document includes a hypertext transfer protocol command associated with a workflow connector object, wherein the workflow connector object connects workflow activity objects, and wherein during the test run of the workflow document, the workflow connector object is accessed, which causes the execution of the hypertext transfer protocol command, which initiates the hypertext transfer protocol request;
        detect a breakpoint object associated with the workflow connector object during the test run of the workflow document; and
        delay a response message for the hypertext transfer protocol request, wherein the delay of the response message causes the test run of the workflow document to suspend a run state.

9. The apparatus of claim 8, wherein the workflow debugger is further operable to:
    receive a continuation command; and
    send the response message in response to receiving the continuation command, wherein the response message causes the test run of the workflow document to resume the run state.

10. The apparatus of claim 9, wherein the workflow debugger is further operable to detect a user input that initiates the continuation command, wherein the user input is initiated within a graphical user interface for a workflow management application.

11. The apparatus of claim 8, wherein the workflow debugger is further operable to:
  detect an expiration of a timeout period; and
  send the response message in response to the expiration of the timeout period, wherein the response message causes the test run of the workflow document to resume the run state.

12. The apparatus of claim 8, wherein the workflow debugger is further operable to:
  detect an expiration of a timeout period; and
  cause the timeout period to extend until receiving a user request to continue the test run of the workflow document.

13. The apparatus of claim 8, wherein the workflow debugger is further operable to:
  detect placement of a breakpoint graphic on a workflow connector graphic in a workflow diagram before the test run of the workflow document, wherein the breakpoint graphic is associated with the breakpoint object and wherein the workflow connector graphic is associated with the flow workflow connector object;
  associate the breakpoint object with the workflow connector object; and
  write the hypertext transfer protocol command in the workflow document in association with the workflow connector object.

14. The apparatus of claim 8, wherein the workflow debugger is further operable to:
  present a debugging console in a graphical user interface in a workflow management application in response to detecting the breakpoint object during the test run, wherein the debugging console includes controls to debug a workflow activity that occurred during the test run of the workflow document subsequent to detecting the breakpoint object.

15. A computer program product for debugging a workflow document, the computer program product comprising:
  a computer readable storage medium having computer readable program code embodied therewith, the computer readable program code comprising:
  computer readable program code configured to:
    detect placement of flow connectors in a graphical flow diagram of a work flow document run in a workflow management application, wherein the graphical flow diagram includes flow activity graphics connected by the flow connectors forming a workflow path;
    insert hypertext transfer protocol request commands into the workflow document at locations associated with the flow connectors;
    initiate a debugging mode that begins a test run of the workflow path;
    encounter one of the flow connectors during the test run of the workflow path;
    execute one of the hypertext transfer protocol request commands associated with the one of the flow connectors;
    send a hypertext transfer protocol request to a debugger application; and
    wait for a response message to the hypertext transfer protocol request from the debugger application;
    receive the response message; and
    continue the test run of the workflow path.

16. The computer program product of claim 15, wherein the workflow management application is a client and the debugger application is a server.

17. The computer program product of claim 15, the computer readable program code being further configured to:
  detect a breakpoint in the one of the flow connectors;
  send an indication of the breakpoint to the debugger application, wherein the debugger application receives the indication of the breakpoint and delays the response message to the hypertext request until receiving a continuation command,
  detect a continuation command;
  send the continuation command to the debugger application, wherein the debugger application receives the continuation command and sends the response message to the workflow management application to continue the test run of the workflow path.

18. The computer program product of claim 17, wherein the computer readable program code configured to detect the continuation command being configured to:
  detect a user input via a graphical user interface associated with the workflow management application, wherein the user input indicates that the workflow path should continue the test run.

19. The computer program product of claim 15, wherein the computer readable program code configured to initiate the debugging mode that begins the test run of the workflow path being further configured to detect a user input that specifies the debugging mode.

20. The computer program product of claim 15, the computer readable program code being configured further configured to:
  detect activity data for a process performed immediately before encountering the one of the flow connectors during the test run of the workflow path;
  detect a user request to view the activity data, during the waiting for the response message to the hypertext transfer protocol request from the debugger application; and
  provide a message indicating the activity data.

* * * * *